United States Patent [19]
Westermann

[11] Patent Number: 6,043,972
[45] Date of Patent: Mar. 28, 2000

[54] FILM CAPACITOR CONVERTIBLE TO SURFACE MOUNTING DEVICE FILM CAPACITOR

[76] Inventor: Wolfgang Westermann, Schellingstrasse 7, 68165 Mannheim, Germany

[21] Appl. No.: 09/040,059

[22] Filed: Mar. 17, 1998

[30] Foreign Application Priority Data

Mar. 17, 1997 [DE] Germany ............ 197 10 963

[51] Int. Cl.⁷ .................. H01G 4/00; H01G 2/20
[52] U.S. Cl. .................... 361/301.3; 361/308.1; 361/310
[58] Field of Search ............. 361/301.3, 301.5, 361/306.1, 307, 308.1, 308.3, 310, 314–315, 323; 29/25.41, 25.42

[56] References Cited

U.S. PATENT DOCUMENTS

| | | | |
|---|---|---|---|
| 4,455,591 | 6/1984 | Lavene | 361/310 |
| 4,578,737 | 3/1986 | Westermann | 361/308.1 |
| 4,656,556 | 4/1987 | Westermann | 361/307 |
| 4,853,825 | 8/1989 | Utner | 361/306.1 |
| 4,931,961 | 6/1990 | Ando et al. | 361/535 |

FOREIGN PATENT DOCUMENTS

| | | |
|---|---|---|
| P 28 41 660 | 4/1980 | Germany. |
| 33 20 257 C2 | 8/1984 | Germany. |
| 35 05 888 C1 | 8/1986 | Germany. |
| 37 05 868 A1 | 1/1988 | Germany. |
| 38 18 347 A1 | 12/1989 | Germany. |

*Primary Examiner*—Kristine Kincaid
*Assistant Examiner*—Anthony Dinkins
*Attorney, Agent, or Firm*—R William Beard, Jr.; Frohwitter

[57] ABSTRACT

Film capacitor of a film/foil or metallized embodiment with a wound or layered structure with a cup sheath or sheath made of thermosetting plastic material with axial or radial connecting wires, in which the sheathed film capacitor, which is a finished component once all the electrical parameters have been tested, is accommodated in a second sheath, which is designed as a cup, and the connecting wires are bent around onto mutually opposite outer sides of this second cup sheath and are in each connected to a connecting metal-sheet section.

13 Claims, 3 Drawing Sheets

FILM CAPACITOR CONVERTIBLE TO SURFACE MOUNTING DEVICE FILM CAPACITOR

FIELD OF THE INVENTION

The present invention relates to film capacitors of all types, that is to say in a film/foil or metallized embodiment with a wound or layered structure with a cup sheath or sheath made of thermosetting plastic material filled with casting resin and having axial or radial connecting wires, with an surface mounting device (SMD) structure.

BACKGROUND OF THE INVENTION

For more than 15 years, attempts have been made to design film capacitors of different types with an SMD structure. DE-PS 33 20 257 discloses a plastic-film wound capacitor with an SMD structure having a sheath made of thermosetting plastic material, for example epoxy-resin pressed compounds, in which a connecting element made of a thin metal sheet has the sprayed-metal layer of the capacitor body applied to one side, and on the other side is fitted flat against the outer side of the thermosetting plastic sheath.

DE-PS 35 05 888 discloses a plastic-film wound capacitor with an SMD structure, in which a radially wired plastic-film wound capacitor body is provided with a cup sheath filled with casting resin, the connecting wires of which body are bent around through 180° and are each connected on mutually opposite narrow sides of the cup sheath to a connecting sheet-metal section.

Nowadays, when a printed circuit board is being populated, a mixture of components are generally fitted, that is to say both radially wired components, in particular radially wired film capacitors, and SMD components, in particular SMD film capacitors are fitted on the printed circuit board. To this extent, there is a requirement in practice for film capacitors of virtually any type to be available both as wired film capacitors and as SMD film capacitors. Taking account of the fact that capacitors are mass-produced articles which are nowadays subject to severe price pressure, even in the relatively high-quality embodiments, it is furthermore necessary when providing wired and SMD film capacitors for as much cost as possible to be saved in terms of production engineering.

The present invention is thus aimed at making available wired film capacitors as SMD film capacitors as well, in a simple way.

SUMMARY OF THE INVENTION

This invention relates to a film capacitor of a film/foil or metallized embodiment with a wound or layered structure with a cup sheath or a sheath made of thermosetting plastic material with axial or radial connecting wires wherein a finished sheathed film capacitor is accommodated in a second cup sheath and the connecting wires are bent around onto mutually opposite outer sides of the second cup sheath and the wires are each connected to a connecting metal-sheet section.

According to the invention, it is possible for the wired film capacitor, which is a finished component and, in principle, is ready for despatch and use once all the electrical parameters have been tested and all printing processes have been carried out, to be converted in a simple manner into an SMD film capacitor by being arranged in a cup sheath, its connecting wires being bent around onto mutually opposite outer sides of the cup sheath, and being connected to a connecting sheet-metal section there. If desired, this conversion of a wired film capacitor into an SMD film capacitor according to the invention can also be carried out locally, at the customer's premises, while printed circuit boards are being populated, since it is possibly only the customer who has to decide whether the desired film capacitor is intended to be fitted to the printed circuit board in wired form or using an SMD structure. This aspect of the present invention is therefore particularly economically valuable since, in this field of industry, more and more specialist companies are concentrating just on the process of populating printed circuit boards.

The hybrid structure of the capacitor according to the invention also has the advantage over unsheathed or single-sheathed SMD types of increased heat protection, which is particularly important if the SMD film capacitor is composed of heat-sensitive films, such as polypropylene.

In one embodiment of the invention, the sheathed film capacitor (1) which is a finished component, is accommodated in a cup sheath is filled with casting resin.

In another embodiment of the invention the sheathed film capacitor (1) which is a finished component, is accommodated in a cup sheath(6) having elastic stud like projections (7) on its inside.

In another embodiment of the invention, the sheathed film capacitor (1) which is a finished component, is a metal/paper would capacitor which has a sheath made of thermosetting plastic material with radial connecting wires and is accommodated in a second cup sheath (6,8) which is filled with casting resin, and in that the radial connecting wires (4) are bent around through 180° and are connected on mutually opposite outer sides (9) of the cup sheath (6) to in each case onto connecting sheet metal section.

In another embodiment of the invention, the connecting wires (4) are bent around towards those narrow sides (9) of the capacitor which are adjacent to the opening in the cup sheath (6).

In another embodiment of the invention, each of the outer sides (9) of the cup sheath (6) is provided with a longitudinal groove (10) into which the bent-around connecting wires (4) is are inserted.

In another embodiment of the invention, the cross-section of the longitudinal groove (10) is somewhat smaller than the cross-section of the connecting wire (4).

In another embodiment of the invention, the narrow sides (9) of the cup sheath (6) have dovetail-like undercuts, in which bent-around edge regions of the sheet metal sections (11) engage.

In another embodiment of the invention, the sheet metal sections (11) are welded to the connecting wires(4).

In another embodiment of the invention, the sheath (6) is composed of a thermosetting plastic material or a thermoplastic material with a melting point above 250° C., such as polyphenylene sulphide or polyamide.

In another embodiment of the invention, the connecting wires (4) are composed of a poorly thermoconductive material, such as nickel silver.

There is a particularly advantageous embodiment of the present invention, namely that a metal/paper wound capacitor which is for the first time designed with an SMD structure and is used as a radio suppression capacitor in particular at the mains input of electrical apparatuses, as a safety component to avoid any risk of fire.

This invention further provides a method for producing a wired film capacitor, in a film/foil or metallized embodiment with a wound or layered structure, with a cup sheath or sheath made of thermosetting plastic material with axial or radial connecting wires, characterized in that the sheathed film capacitor, which is a finished component once all the electrical parameters have been tested, is inserted into a second sheath, which is designed as cup, the connecting wires of such film capacitor are bent around onto mutually opposite outer sides of the cup sheath and are in each case connected to a connecting sheet-metal section there.

Other advantages, features and application options of the present invention result from the following description of an exemplary embodiment in conjunction with the drawing

DETAILED DESCRIPTION OF THE INVENTION

Figure 1:
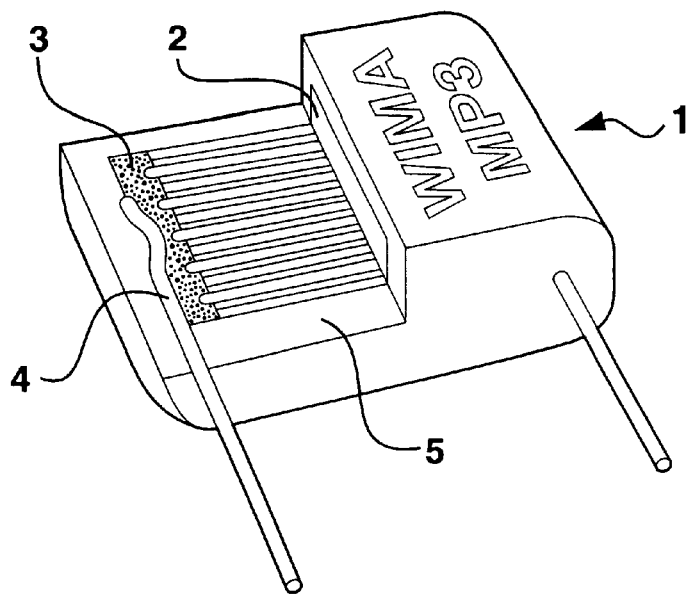
FIG. 1 shows a known, wired metal/paper radio suppression capacitor.
Figure 2:
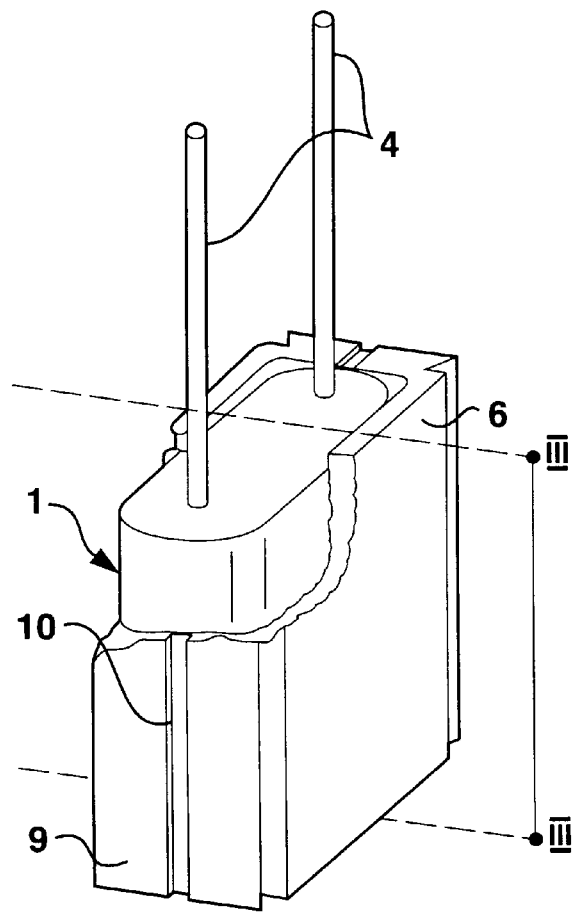
FIG. 2 shows schematically in a cut-away perspective illustration, the capacitor according to FIG. 1 in a cup sheath.

FIG. 1 shows a metal/paper radio suppression capacitor 1, such as that marketed by the Company Wilhelm Westermann under the trade name WIMA MP 3. This metal/paper radio suppression capacitor 1 has a capacitor body 2 made of metallized capacitor paper which is impregnated with epoxy resin. Radial connecting wires 4 are connected from the sprayed-metal layers 3 of the capacitor body 2 to the outside, through a sheath 5 made of flame-retardant epoxy resin, additionally sheathed by an outer metal foil.

This metal/paper radio suppression capacitor 1 is accommodated, as illustrated in two exemplary embodiments in FIGS. 2, 3 and FIGS. 4 to 6, in a cup sheath 6 which is used for conversion into an SMD component. A plastic material is chosen for the cup sheath 6, said plastic material having adequate resistance and adequate load capacity for the thermal loads which occur in the commonest SMD soldering processes. In addition to thermosetting plastic materials, suitable plastic materials are thermoplastic synthetic materials with melting points above 250° C., such as polyphenylene sulphide, polyamide etc.

Figure 3:
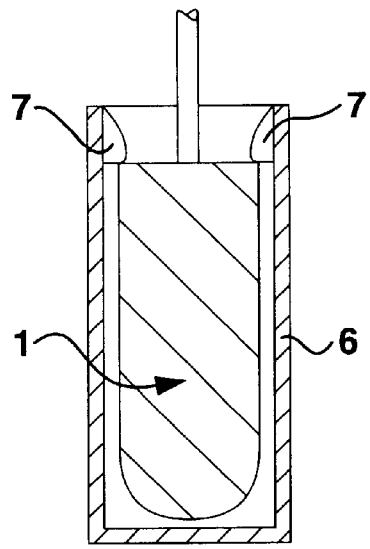
FIG. 3 shows a cross-section along the line III—III in FIG. 2 with stud-like projections for fixing the capacitor in the cup sheath.
Figure 4:
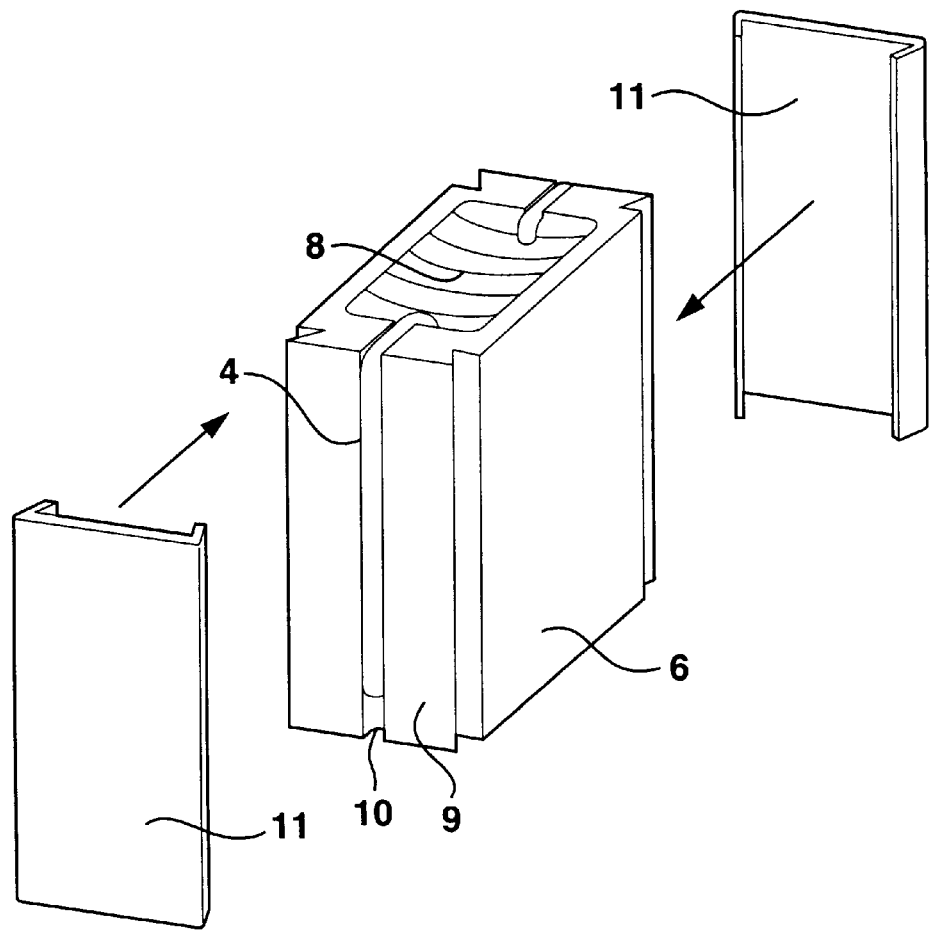
FIG. 4 shows schematically in a perspective illustration, the capacitor according to FIG. 1 in a cup sheath which is filled with casting resin and has bent-around connecting wires and schematically illustrated sheet-metal sections, before the latter are connected to the connecting wires.
Figure 5:
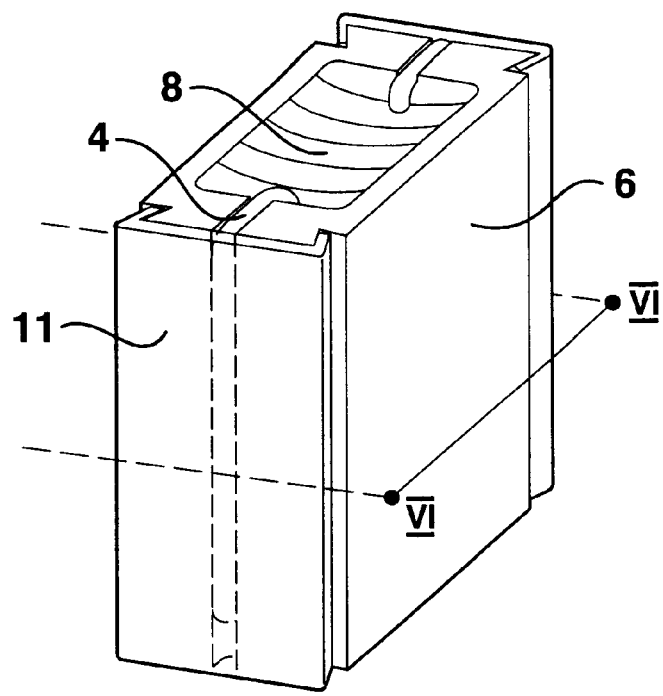
FIG. 5 shows a perspective illustration, corresponding to FIG. 4, of the SMD film capacitor according to the invention.
Figure 6:
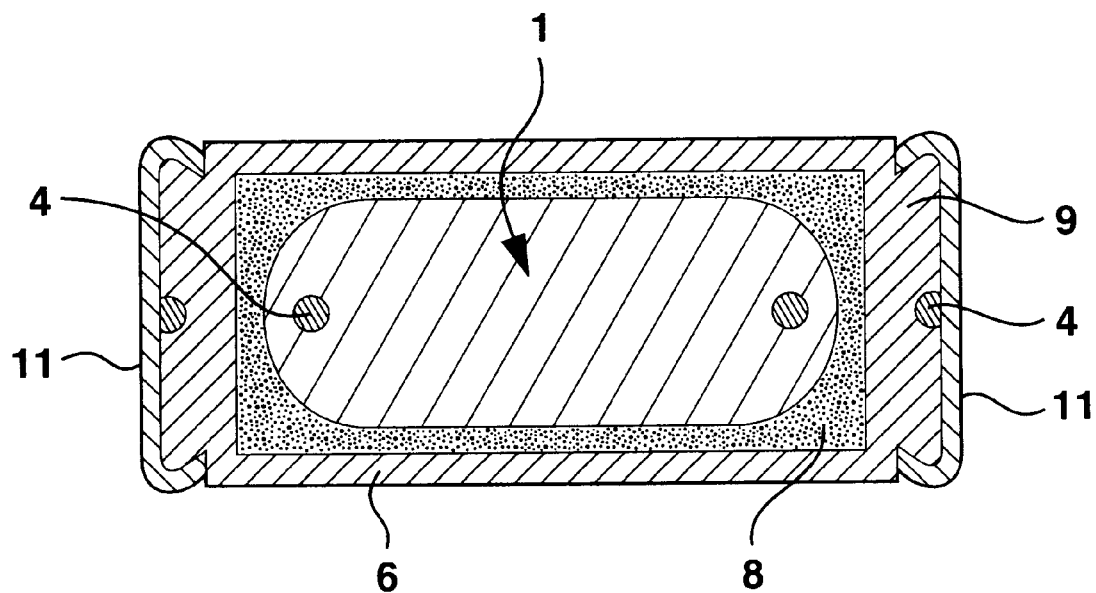
FIG. 6 shows a cross-section along the line VI—VI in FIG. 5.

The wired film capacitor, such as the metal/paper radio suppression capacitor 1 illustrated in FIG. 1, can be fixed in the cup sheath 6 by purely mechanical aids, such as elastic stud-like projections 7 on the inside of the cup sheath 6 (snap-in principle), as shown in FIG. 3. It can also be fixed by means of a potting compound 8 composed of curable polyester or epoxy resin, other suitable synthetic resins or bitumen, as is evidenced from the exemplary embodiment according to FIGS. 4 to 6. A combination of mechanical fixing and subsequent potting also appears to be feasible and advantageous.

The narrow sides 9 of the cup sheath 6 are designed in a dovetail-shape, that is to say they have dovetail-like undercuts on their side longitudinal edges. The narrow sides 9 are in each case split by a longitudinal groove 10, which is designed for latching in (the cross-section of the longitudinal groove 10 is somewhat smaller than the cross-section of the connecting wires 4), and is used to accommodate the connecting wire 4. The two connecting wires 4 are bent around through 180° and are inserted into the longitudinal grooves 10 for latching in. Smooth, rectangular, tin-coated sheet-metal sections 11 are fitted onto the narrow sides 9 of the cup sheath 6 and over the inserted connecting wires 4, as is evident from FIGS. 4 to 6. Bent-around edge regions of the sheet-metal sections 11 engage in the dovetail-like undercuts in the narrow sides 9 of the cup sheath 6, by which means the sheet-metal sections 11 are attached to the cup sheath 6 and are connected to the connecting wires 4. The sheet-metal sections 11 and the connecting wires 4 underneath them are pressed into contact with one another since the connecting wires 4 project somewhat beyond the longitudinal groove 10, as is evident in particular from FIG. 6. The sheet-metal sections 11 and the connecting wires 4 underneath them can subsequently be welded to one another by means of a suitable method. The complete SMD capacitor, a metal/paper capacitor of hybrid construction, is illustrated schematically in FIG. 5 and, in cross-section along the line VI—VI of FIG. 5 in FIG. 6.

What is claimed is:

1. A film capacitor comprising a finished film capacitor of a metallized embodiment with a wound or layered structure with a first sheath made of thermosetting plastic material with connecting wires, said film capacitor comprising a second sheath which is a cup sheath and a plurality of metal sheet sections wherein said first sheath made of thermosetting plastic material is within the second cup sheath, wherein the connecting wires are bent around onto mutually opposite outer sides of the second cup sheath and the wires are each connected to a metal-sheet section.

2. A film capacitor according to claim 1, wherein the second cup sheath containing the finished sheathed film capacitor is filled with casting resin.

3. A film capacitor according to claim 1, wherein the second cup sheath has elastic stud like projections on its inside.

4. A film capacitor according to claim 2, wherein the finished film capacitor is a metal/paper wound capacitor with said connecting wires being radial and the radial connecting wires are bent around through 180° and are connected on mutually opposite outer sides of the second cup sheath to a sheet-metal section.

5. A film capacitor according to claim 1 wherein the connecting wires are bent around towards narrow sides of the capacitor which are adjacent to an opening in the second cup sheath.

6. A film capacitor according to claim 5 wherein the narrow sides of the second cup sheath have dovetail-like undercuts, in which bent-around edge regions of the sheet metal sections engage.

7. A film capacitor according to claim 1 wherein each of the outer sides of the second cup sheath comprises a longitudinal groove into which the bent-around connecting wires are inserted.

8. A film capacitor according to claim 7 wherein the cross-section of the longitudinal groove is somewhat smaller than the cross-section of the connecting wires.

9. A film capacitor according to claim 1 wherein the sheet metal sections are welded to the connecting wires.

10. A film capacitor according to claim 1 wherein the thermosetting plastic material has a melting point above 250° C.

11. The film capacitor of claim 10 wherein the thermosetting plastic material comprises polyphenylene sulphide or polyamide.

12. A film capacitor according to claim 1 wherein the connecting wires are composed of a poorly thermoconductive material.

13. The film capacitor of claim 11 wherein the poorly thermoconductive material comprises nickel silver.

* * * * *